US009262880B2

(12) United States Patent
Miyazawa

(10) Patent No.: US 9,262,880 B2
(45) Date of Patent: Feb. 16, 2016

(54) KEYLESS ENTRY SYSTEM

(71) Applicant: ALPS ELECTRIC CO., LTD., Tokyo (JP)

(72) Inventor: Akira Miyazawa, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 20 days.

(21) Appl. No.: 14/505,375

(22) Filed: Oct. 2, 2014

(65) Prior Publication Data

US 2015/0102905 A1 Apr. 16, 2015

(30) Foreign Application Priority Data

Oct. 11, 2013 (JP) ................................ 2013-213620

(51) Int. Cl.
*G11B 9/00* (2006.01)
*G07C 9/00* (2006.01)

(52) U.S. Cl.
CPC ........ *G07C 9/00182* (2013.01); *G07C 9/00007* (2013.01); *G07C 2009/00222* (2013.01); *G07C 2009/00793* (2013.01); *G07C 2209/61* (2013.01)

(58) Field of Classification Search
CPC ... G07C 9/00; G07C 9/00309; G07C 9/00007
USPC .............................. 340/5.61–5.64, 5.71–5.74
See application file for complete search history.

(56) References Cited

U.S. PATENT DOCUMENTS 5,252,960 A * 10/1993 Duhame ............ G07C 9/00182 340/5.64
5,864,297 A * 1/1999 Sollestre ........... G07C 9/00817 340/426.36

FOREIGN PATENT DOCUMENTS

JP 2-91864 U 7/1990
JP 11-81764 3/1999

* cited by examiner

*Primary Examiner* — Allen T Cao
(74) *Attorney, Agent, or Firm* — Beyer Law Group LLP

(57) ABSTRACT

A keyless entry system includes a transmitter and a receiver. The transmitter includes an operation switch, transmission means, and transmission control means. The receiver includes receiving means and determination means. The transmission control means generates operation information including a function code corresponding to the operation switch and a count value corresponding to the number of operations of the operation switch. The transmission means transmits the operation information using a plurality of radio signals in different frequency bands. The receiving means receives the plurality of radio signals and detects the operation information from the plurality of received radio signals. The determination means specifies the content of an instruction to the device based on the function code and the count value included in the operation information.

7 Claims, 7 Drawing Sheets

FIG. 4A

| CONTENT OF PRESSING OPERATION | | OPERATION INFORMATION | |
|---|---|---|---|
| OPERATION SWITCH | NUMBER OF OPERATIONS | FUNCTION CODE | COUNT VALUE |
| FIRST OPERATION SWITCH | 1 | LOCKING | 1 |
| FIRST OPERATION SWITCH | 2 | LOCKING | 2 |
| SECOND OPERATION SWITCH | 1 | UNLOCKING | 1 |
| SECOND OPERATION SWITCH | 2 | UNLOCKING | 2 |

FIG. 4B

| OPERATION INFORMATION | | INSTRUCTION CONTENT OF VEHICLE OPERATION |
|---|---|---|
| FUNCTION CODE | COUNT VALUE | |
| LOCKING | 1 | LOCK ALL DOORS |
| LOCKING | 2 | LOCK ALL DOORS |
| UNLOCKING | 1 | UNLOCK DOOR OF DRIVER'S SEAT |
| UNLOCKING | 2 | UNLOCK ALL DOORS |

KEYLESS ENTRY SYSTEM

CLAIM OF PRIORITY

This application claims benefit of Japanese Patent Application No. 2013-213620 filed on Oct. 11, 2013, which is hereby incorporated by reference.

BACKGROUND OF THE INVENTION

1. Field of the Invention

The present invention relates to a keyless entry system, and in particular, to a keyless entry system that can transmit operation information corresponding to multiple operations on the operation switch.

2. Description of the Related Art

In recent years, a keyless entry system that can perform a vehicle operation such as the locking and unlocking of the door of the vehicle, without using a mechanical key, using radio communication between a portable device carried by the user and an in-vehicle device mounted in the vehicle has come into wide use. The portable device used in such a keyless entry system needs to be small for convenience, and accordingly, the number of operation switches that can be placed in the portable device is limited. Therefore, for example, a keyless entry system that can select a plurality of vehicle operations according to the number of operations of the operation switch has been demanded. In such a keyless entry system, it has become necessary to reliably transmit operation information corresponding to an operation on the operation switch to the in-vehicle device even if the operation is performed multiple times.

As a technique for such a keyless entry system, a keyless entry system 100 disclosed in Japanese Unexamined Patent Application Publication No. 11-081764, a locking and unlocking device 200 (keyless entry system) disclosed in Japanese Unexamined Utility Model Registration Application Publication No. 2-91864, and the like have been proposed. FIG. 6 is an explanatory view showing the configuration of the keyless entry system 100 disclosed in Japanese Unexamined Patent Application Publication No. 11-081764. FIG. 7 is an explanatory view showing the configuration of the locking and unlocking device 200 disclosed in Japanese Unexamined Utility Model Registration Application Publication No. 2-91864.

As shown in FIG. 6, the keyless entry system 100 includes a transmitter 101 (portable device) and a receiver 102 (in-vehicle device). The transmitter 101 includes an operation switch 112, transmission means 113, and transmission control means 111. The operation switch 112 is a switch used when a user gives an instruction to use a function. The transmission means 113 includes an oscillation circuit 114, a modulation circuit 115, and a transmission antenna 116. The transmission means 113 converts a function code (operation information), which indicates the instruction content corresponding to the operation on the operation switch 112, to a remote control signal (radio signal) of the radio wave and transmits the remote control signal. The transmission control means 111 includes a microprocessor 118 and a RAM 119. The transmission control means 111 controls the transmission means 113. The receiver 102 receives the remote control signal transmitted from the transmitter 101 and operates a device 3, which is a keyless entry target, based on the instruction content of the function code included in the received remote control signal.

In the keyless entry system 100, when the operation switch is operated while the transmission processing is being performed by the transmission means 113, a function code corresponding to the operation under transmission processing is stored in transmission control means 111, and the stored function code is converted into a remote control signal to be transmitted by the transmission means 113 after the end of previous transmitting processing. In this manner, in the keyless entry system 100, even if an operation on the operation switch 112 is performed multiple times in a short period of time, it is possible to perform a process of transmitting the function code corresponding to the operation.

As shown in FIG. 7, the locking and unlocking device 200 includes key code transmission means 201 (portable device), a key code receiver 202 (in-vehicle device), and key code verification means 203. The key code transmission means 201 transmits a signal (radio signal) including predetermined key code information (operation information). The key code transmission means 201 transmits a key code multiple times at predetermined intervals. In addition, the frequency of the carrier that carries the key code thereon is controlled so as to be different each time of transmission.

The key code receiver 202 receives a signal transmitted by the key code transmission means 201. The key code verification means 203 compares the key code included in the signal received by the key code receiver 202 with a key code stored in advance, and outputs a locking and unlocking signal when both the key codes match each other.

Although there is no explanation regarding the operation switch in Japanese Unexamined Utility Model Registration Application Publication No. 2-91864, a key code corresponding to the operation on the operation switch can be transmitted by connecting the operation switch to the key code transmission means 201 of the locking and unlocking device 200.

In the keyless entry system 100 disclosed in Japanese Unexamined Patent Application Publication No. 11-081764, even if an operation on the operation switch 112 is performed multiple times in a short period of time, it is possible to perform a process of transmitting the function code corresponding to the operations. However, when the noise of the same frequency as a remote control signal is generated during transmission of the function code, communication between the transmitter 101 and the receiver 102 is interrupted, and accordingly, the receiver 102 cannot receive the remote control signal reliably. As a result, there has been a problem in that it is not possible to reliably transmit the function code. In addition, for example, when only the remote control signal corresponding to the first operation is transmitted despite having performed the operation on the operation switch 112 twice, there is a possibility that the device 3 will operate unlike the intention of the user.

On the other hand, in the locking and unlocking device 200 disclosed in Japanese Unexamined Utility Model Registration Application Publication No. 2-91864, even if the noise of the same frequency as one of the carriers is generated during transmission of the key code, it is possible to transmit the key code using carriers of other frequencies. In the locking and unlocking device 200, however, since the key code is transmitted multiple times at predetermined intervals, it takes time to transmit the key code. For this reason, when the operation on the operation switch is performed multiple times in a short period of time, there is a possibility that the key code may not be reliably transmitted.

SUMMARY OF THE INVENTION

The present invention provides a keyless entry system that can more reliably transmit operation information corresponding to multiple operations on the operation switch.

According to an aspect of the present invention, there is provided a keyless entry system including: a transmitter; and a receiver. The keyless entry system operates a device as a keyless entry target using radio communication between the transmitter and the receiver. The transmitter includes an operation switch configured to give an instruction to operate the device, transmission means for transmitting operation information corresponding to an operation on the operation switch using a radio signal, and transmission control means for generating the operation information and controlling the transmission means. The receiver includes receiving means for receiving the radio signal and detecting the operation information from the received radio signal and determination means for specifying content of an instruction to the device based on the operation information. The transmission control means generates operation information including a function code corresponding to the operation switch and a count value corresponding to the number of operations of the operation switch. The transmission means transmits the operation information using a plurality of radio signals in different frequency bands. The receiving means receives the plurality of radio signals and detects the operation information from the plurality of received radio signals. The determination means specifies content of an instruction to the device based on the function code and the count value included in the operation information.

The keyless entry system of the above-described configuration includes the transmitter and the receiver. In addition, the transmitter includes the transmission means for transmitting operation information corresponding to the pressing operation on the operation switch using a radio signal, and the receiver includes the receiving means for receiving the radio signal from the transmitter and detecting the operation information from the received radio signal. The operation information includes a function code corresponding to the operation switch and a count value corresponding to the number of operations of the operation switch. Therefore, in the keyless entry system, the operation information corresponding to multiple operations on the operation switch can be transmitted from the transmitter to the receiver.

In addition, since the transmitter can transmit information regarding the number of operations of the operation switch collectively as a count value, it is possible to easily prevent transmission leakage. The transmitter transmits the operation information using a plurality of radio signals in different frequency bands, and the receiver receives the plurality of radio signals and detects the operation information from the plurality of received radio signals. Therefore, even if noise of the same frequency as one of the plurality of radio signals is generated, it is possible to transmit the operation information using the other radio signals. As a result, in the keyless entry system of the above-described configuration, it is possible to transmit the operation information more reliably.

In the keyless entry system described above, the transmission means may transmit the operation information of the same content simultaneously using the plurality of radio signals, and the receiving means may receive the plurality of radio signals simultaneously and detects the operation information from the plurality of received radio signals.

In the keyless entry system of the above-described configuration, the transmitter transmits the operation information of the same content simultaneously using a plurality of radio signals in different frequency bands, and the receiver receives the plurality of radio signals simultaneously. Therefore, even if noise of the same frequency as one of the plurality of radio signals is generated and loss of information occurs in the operation information transmitted using the radio signal, the missing information can be recovered using the operation information transmitted using the other radio signals. As a result, it is possible to transmit the operation information more reliably. In addition, since the transmitter transmits the operation information of the same content simultaneously using a plurality of radio signals, it is possible to reduce the time taken to transmit the operation information, compared with the case where the operation information of the same content is transmitted multiple times at predetermined intervals.

In the keyless entry system described above, the plurality of radio signals may be two radio signals in different frequency bands, the transmitter may include two transmission means for transmitting the two radio signals, and the receiver may include two receiving means for receiving the two radio signals.

In such a system, when an attempt to reduce the size of the transmitter is made, the configuration of the transmitter becomes complicated if the number of radio signals is large. This becomes an obstacle to miniaturization. However, in the keyless entry system of the above-described configuration, the operation information is transmitted and received using two radio signals. Therefore, it is possible to simplify the configuration of the transmitter while maintaining the reliability of transmission of operation information.

In the keyless entry system described above, the plurality of radio signals may be radio signals in a UHF band, the radio signals having frequencies separated from each other by 300 MHz or more.

In such a system, when a plurality of radio signals are radio signals having frequencies close to each other, interference easily occurs between the plurality of radio signals. This may interrupt the transmission of operation information. However, in the keyless entry system of the above-described configuration, the plurality of radio signals are radio signals in the UHF band, the radio signals having frequencies separated from each other by 300 MHz or more. Therefore, it is possible to suppress interference between the plurality of radio signals. As a result, it is possible to transmit the operation information more reliably.

In the keyless entry system described above, the transmitter may be a portable device carried by a user, the receiver may be an in-vehicle device mounted in a vehicle, and the device may be an in-vehicle device mounted in the vehicle.

By applying the keyless entry system of the above-described configuration to a vehicle, it is possible to perform a vehicle operation corresponding to multiple operations on the operation switch and to transmit an instruction regarding the vehicle operation to the vehicle side more reliably.

BRIEF DESCRIPTION OF THE DRAWINGS

FIGS. 4A and 4B are explanatory views showing an example of the vehicle operation according to the embodiment of the present invention;

DESCRIPTION OF THE PREFERRED EMBODIMENTS

Hereinafter, embodiments of the present invention will be described with reference to the accompanying diagrams. The following explanation will be given on the assumption that an X1 direction is a left direction, an X2 direction is a right direction, a Y1 direction is a forward direction, a Y2 direction is a backward direction, a Z1 direction is an upward direction, and a Z2 direction is a downward direction in each diagram.

Figure 1:
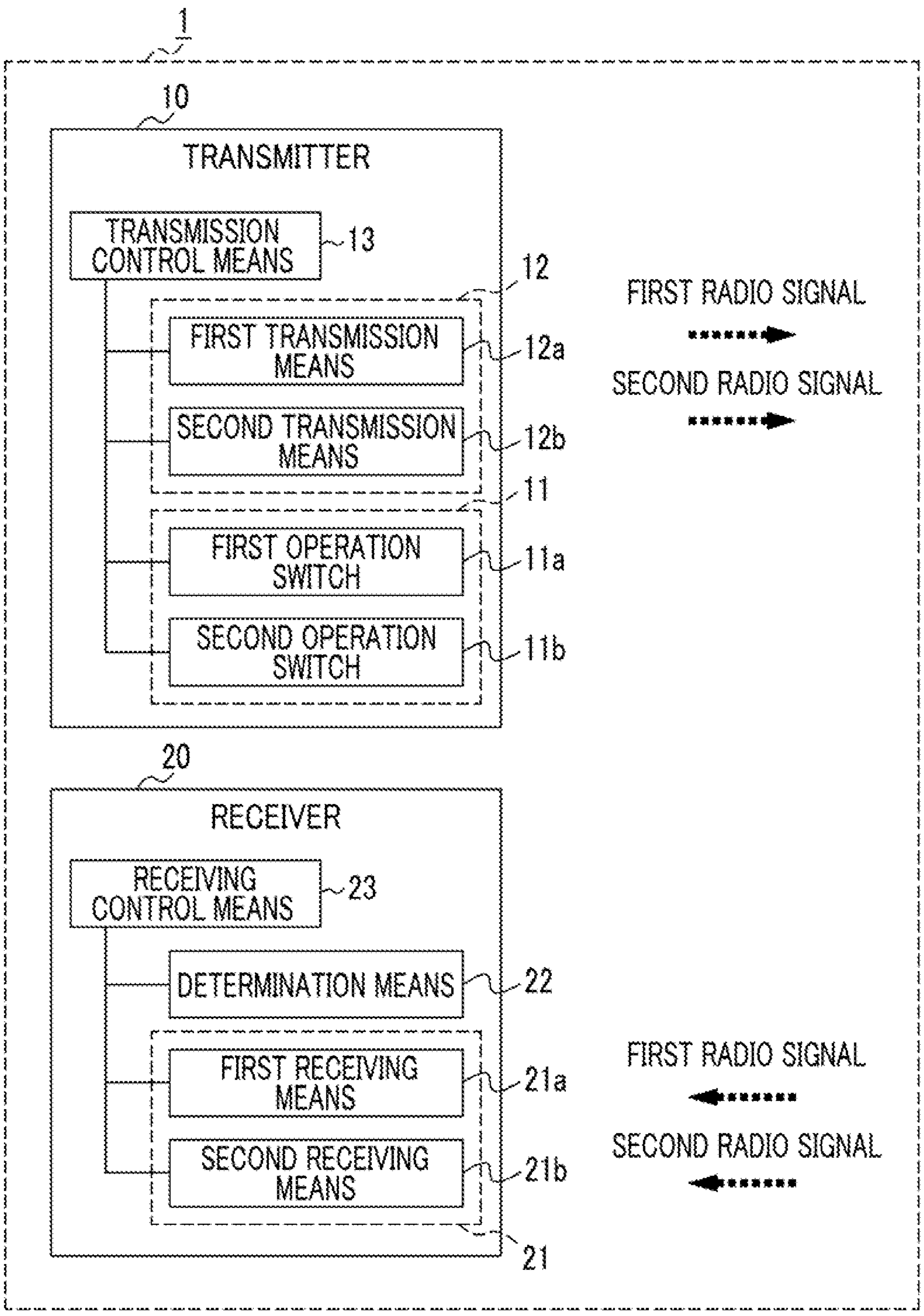
FIG. 1 is a block diagram showing the configuration of a keyless entry system according to an embodiment of the present invention.
Figure 2:
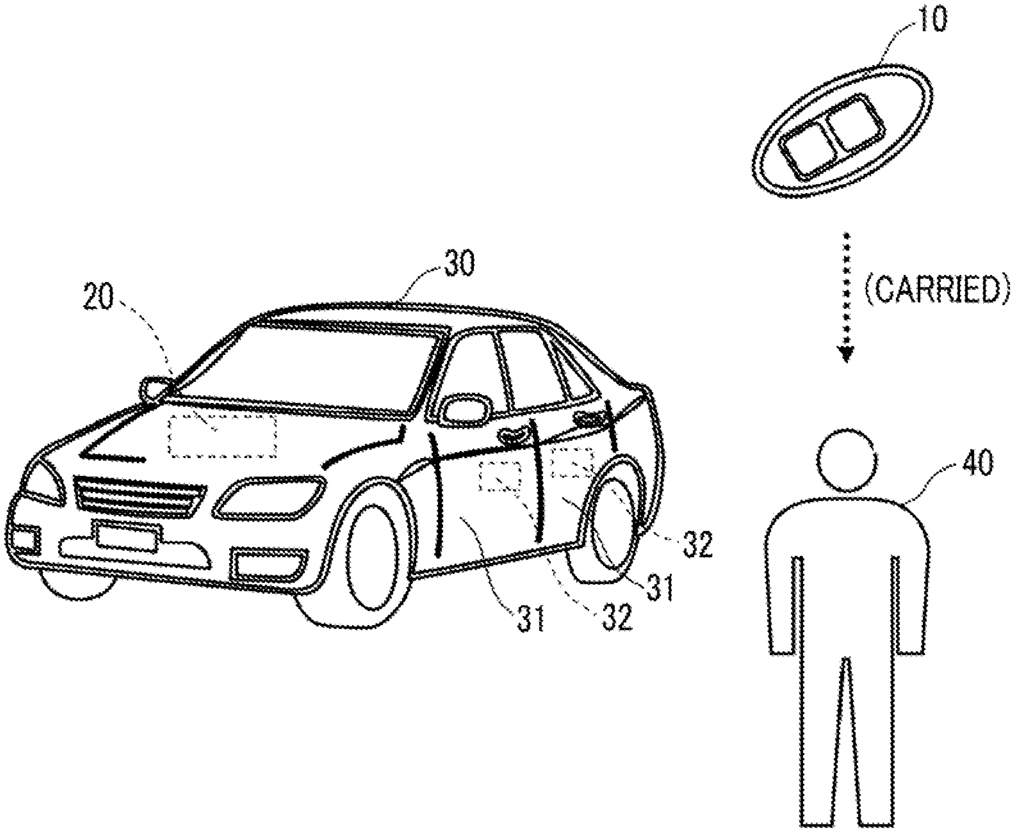
FIG. 2 is an explanatory view showing an example of use of the keyless entry system shown in FIG. 1.
Figure 3A:
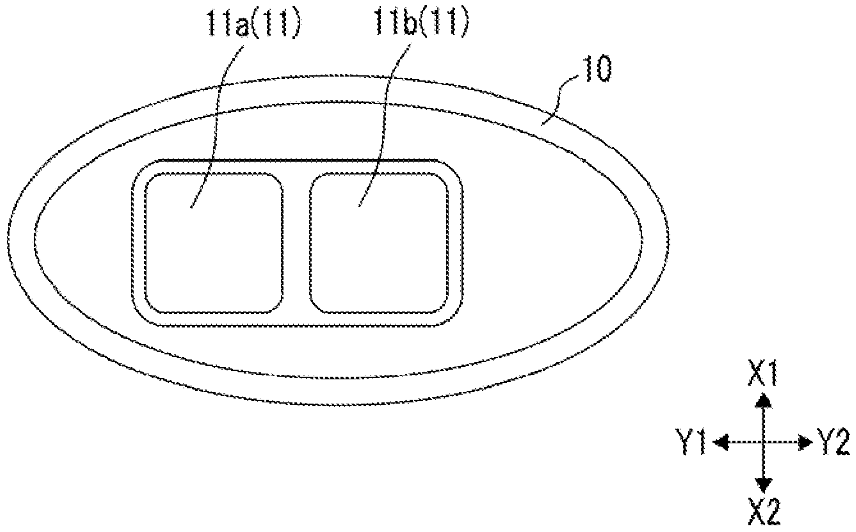
FIGS. 3A and 3B are explanatory views showing the structure of a transmitter shown in FIG. 1.
Figure 3B:
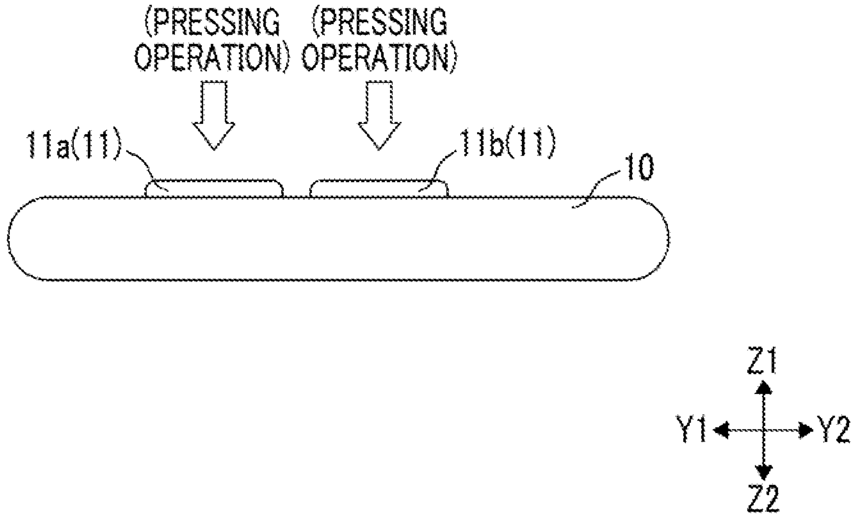

First, the configuration of a keyless entry system 1 according to the present embodiment will be described with reference to FIGS. 1 to 3B. FIG. 1 is a block diagram showing the configuration of the keyless entry system 1 according to the embodiment of the present invention. FIG. 2 is an explanatory view showing an example of use of the keyless entry system 1 shown in FIG. 1. FIGS. 3A and 3B are explanatory views showing the structure of a transmitter 10 shown in FIG. 1. FIG. 3A is a top view, and FIG. 3B is a side view.

As shown in FIG. 1, the keyless entry system 1 includes the transmitter 10 and a receiver 20. As shown in FIG. 2, the transmitter 10 is a portable device carried by a user 40 of a vehicle 30. The receiver 20 is an in-vehicle device mounted in the vehicle 30. An in-vehicle device, such as a door locking device 32 for locking and unlocking a door 31 of the vehicle 30 is mounted in the vehicle 30.

In the keyless entry system 1, radio communication between the transmitter 10 and the receiver 20 is possible, and various kinds of instructions or information are transmitted from the transmitter 10 to the receiver 20 using the radio communication between the transmitter 10 and the receiver 20. Operation information regarding the vehicle operation, such as the locking and unlocking of the door 31 of the vehicle 30, is included in the information transmitted from the transmitter 10 to the receiver 20. Based on the operation information transmitted from the transmitter 10 to the receiver 20, the receiver 20 transmits an instruction to an in-vehicle device, such as the door locking device 32. As a result, a vehicle operation, such as the locking and unlocking of the door 31 of the vehicle 30, is performed. Thus, in the keyless entry system 1, using the radio communication between the transmitter 10 and the receiver 20, it is possible to perform a vehicle operation without using a mechanical key.

Next, the configuration of the transmitter 10 will be described. As shown in FIG. 1, the transmitter 10 includes two operation switches 11, transmission means 12, and transmission control means 13.

The two operation switches 11 are first and second operation switches 11*a* and 11*b*. The first operation switch 11*a* is an operation switch for instructing the locking of the door 31 of the vehicle 30. The second operation switch 11*b* is an operation switch for instructing the unlocking of the door 31 of the vehicle 30. As shown in FIGS. 3A and 3B, the two operation switches 11 are disposed at predetermined positions of the transmitter 10 so as to be able to be pressed.

The transmission means 12 includes first transmission means 12*a* and second transmission means 12*b*. The first transmission means 12*a* transmits a first radio signal to the receiver 20 in response to the instruction of the transmission control means 13. The first radio signal is an electromagnetic wave signal having a frequency in the UHF (ultra high frequency) band. As the first radio signal, for example, a signal having a frequency in the 900 MHz band is used. In addition, modulation, such as FM modulation, can be applied to the first radio signal.

The second transmission means 12*b* transmits a second radio signal to the receiver 20 in response to an instruction of the transmission control means 13. The second radio signal is also an electromagnetic wave signal having a frequency in the UHF band, but a signal in a frequency band different from the first radio signal is used as the second radio signal. As the second radio signal, for example, a signal having a frequency in the 2.4 GHz band is used. In addition, modulation, such as FM modulation, can be applied to the second radio signal.

The transmission control means 13 monitors the two operation switches 11. When the operation switch 11 is pressed, the transmission control means 13 checks which operation switch 11 of the first and second operation switches 11*a* and 11*b* has been pressed, and sets a function code corresponding to the pressed operation switch 11.

In addition, the transmission control means 13 has a timer function, and monitors how many times the operation switch 11 has been pressed (hereinafter, referred to as the number of operations of the operation switch 11) until a predetermined amount of time passes from the first pressing operation on each operation switch 11. In addition, the transmission control means 13 sets a count value corresponding to the number of operations of the operation switch 11. When a predetermined amount of time has passed from the first pressing operation on each operation switch 11, the count value is reset. Then, when the operation switch 11 is pressed, the pressing operation is monitored as a new operation.

Thus, the transmission control means 13 sets a function code corresponding to the pressed operation switch 11 and a count value corresponding to the number of operations of the operation switch 11. In addition, the transmission control means 13 generates operation information including the function code and the count value that have been set.

In addition, the transmission control means 13 controls the transmission means 12. The transmission control means 13 acquires a signal including operation information by modulating the first radio signal, and transmits the first radio signal including the operation information from the first transmission means 12*a* to the receiver 20. In addition, the transmission control means 13 acquires a signal including operation information by modulating the second radio signal, and transmits the second radio signal including the operation information from the second transmission means 12*b* to the receiver 20. In the present embodiment, the transmission control means 13 transmits the first and second radio signals, in which operation information of the same content is included, simultaneously.

The transmitter 10 transmits a radio signal (first and second radio signals) including the operation information to the receiver 20. Hereinafter, transmitting a radio signal including operation information will be abbreviated to transmitting operation information.

Next, the configuration of the receiver 20 will be described. As shown in FIG. 1, the receiver 20 includes receiving means 21, determination means 22, and receiving control means 23.

The receiving means 21 includes first receiving means 21*a* and second receiving means 21*b*. The first receiving means 21*a* receives a first radio signal transmitted from the first transmission means 12*a* of the transmitter 10, and detects the operation information from the first radio signal by detecting the received first radio signal. At the same time, the second receiving means 21*b* receives the second radio signal transmitted from the second transmission means 12*b* of the transmitter 10, and detects the operation information from the second radio signal by detecting the received second radio signal.

Thus, since the first receiving means 21*a* of the receiver 20 receives the first radio signal transmitted from the first transmission means 12*a* of the transmitter 10 and detects the operation information from the first radio signal by detecting the received first radio signal, it is possible to transmit the operation information from the transmitter 10 to the receiver 20. In addition, since the second receiving means 21*b* of the receiver 20 receives the second radio signal transmitted from the second transmission means 12*b* of the transmitter 10 and detects the operation information from the second radio signal by detecting the received second radio signal, it is possible to transmit the operation information from the transmitter 10 to the receiver 20.

The determination means 22 acquires the operation information transmitted using the first radio signal and the operation information transmitted using the second radio signal, and specifies the instruction content of the vehicle operation based on the function code and the count value included in the acquired operation information.

When the operation information is transmitted from the transmitter 10, if noise of the same frequency as one of the first and second radio signals is generated, there is a possibility that the loss of information will be caused by the influence of noise. Therefore, the determination means 22 checks for the loss of information in the transmitted operation information. Then, when there is a loss of information in any of the operation information transmitted using the first radio signal and the operation information transmitted using the second radio signal, the determination means 22 recovers the missing information using the other operation information.

Recovery of missing information is performed as follows, for example. First, when there is no loss in the operation information transmitted using the first radio signal and there is a loss in the operation information transmitted using the second radio signal, the operation information transmitted using the first radio signal is used. In addition, when there is a loss in the operation information transmitted using the first radio signal and there is no loss in the operation information transmitted using the second radio signal, the operation information transmitted using the second radio signal is used. In addition, when a function code of the operation information transmitted using the first radio signal is missing and a count value of the operation information transmitted using the second radio signal is missing, a function code of the operation information transmitted using the second radio signal and a count value of the operation information transmitted using the first radio signal are used.

The receiving control means 23 controls the receiving means 21 and the determination means 22. In addition, the receiving control means 23 is connected to an in-vehicle device, such as the door locking device 32, through a wiring line (not shown). Then, the receiving control means 23 acquires the instruction content of the specified vehicle operation from the determination means 22, and transmits an instruction corresponding to the specified vehicle operation to an in-vehicle device, such as the door locking device 32.

Thus, in the keyless entry system 1, the transmitter 10 transmits the operation information using the radio signal (first and second radio signals), and the receiver 20 receives the radio signal transmitted from the transmitter 10 and detects the operation information from the received radio signal. Then, the receiver 20 specifies the instruction content of the vehicle operation based on the function code and the count value included in the detected operation information, and transmits an instruction corresponding to the specified vehicle operation to the in-vehicle device.

Next, an example of the vehicle operation using the keyless entry system 1 will be described with reference to FIGS. 4A and 4B. FIGS. 4A and 4B are explanatory views showing an example of the vehicle operation according to the embodiment of the present invention. FIG. 4A is a table showing the content of the pressing operation on the operation switch 11 and operation information corresponding thereto. FIG. 4B is a table showing the operation information and the instruction content of the vehicle operation corresponding thereto. FIGS. 4A and 4B show an example of locking or unlocking the door 31 of the vehicle 30 by pressing one of the first and second operation switches 11*a* and 11*b* once or twice within a predetermined amount of time.

As shown in FIGS. 4A and 4B, when the first operation switch 11*a* of the two operation switches 11 is pressed once within the predetermined amount of time, the function code is set to “locking” and the count value is set to “1”. In addition, the vehicle operation corresponding to the function code and the count value is set to “locking of all doors”. When the first operation switch 11*a* is pressed twice within the predetermined amount of time, the function code is set to “locking” and the count value is set to “2”. In addition, the vehicle operation corresponding to the function code and the count value is also set to “locking of all doors”.

When the second operation switch 11*b* is pressed once within the predetermined amount of time, the function code is set to “unlocking” and the count value is set to “1”. In addition, the vehicle operation corresponding to the function code and the count value is set to “unlocking of the door of driver’s seat”. When the second operation switch 11*b* is pressed twice within the predetermined amount of time, the function code is set to “unlocking” and the count value is set to “2”. In addition, the vehicle operation corresponding to the function code and the count value is set to “unlocking of all doors”.

As described above, in the keyless entry system 1, operation information corresponding to the pressing operation on the operation switch 11 is transmitted from the transmitter 10 to the receiver 20. Then, the receiver 20 specifies the instruction content of the vehicle operation based on the function code and the count value included in the transmitted operation information, and transmits an instruction corresponding to the specified vehicle operation to the in-vehicle device, such as the door locking device 32. As a result, in the keyless entry system 1, a vehicle operation corresponding to the function code and the count value is performed.

Figure 5:
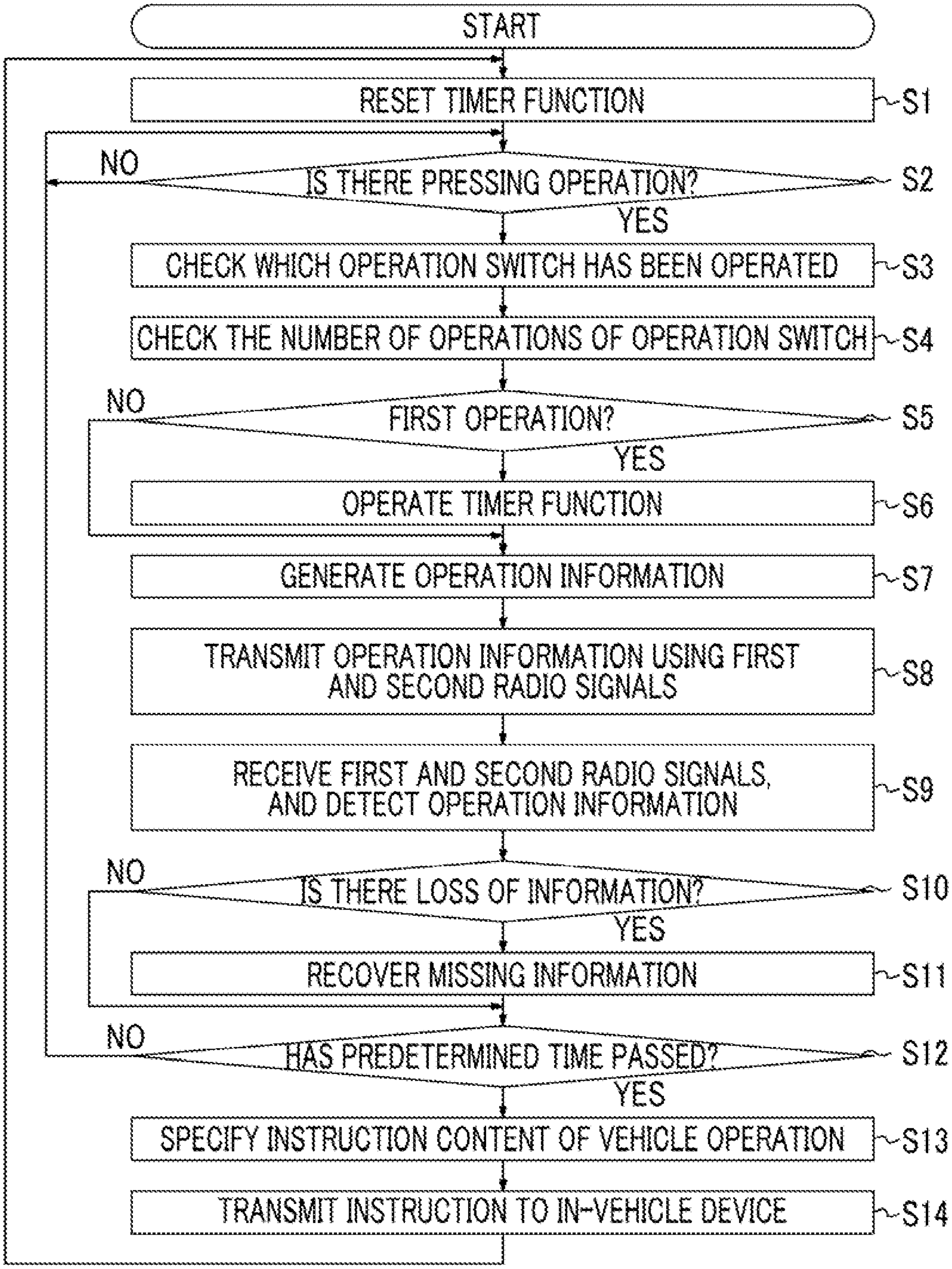
FIG. 5 is a flowchart showing the procedure of the vehicle operation according to the embodiment of the present invention.
Figure 6:
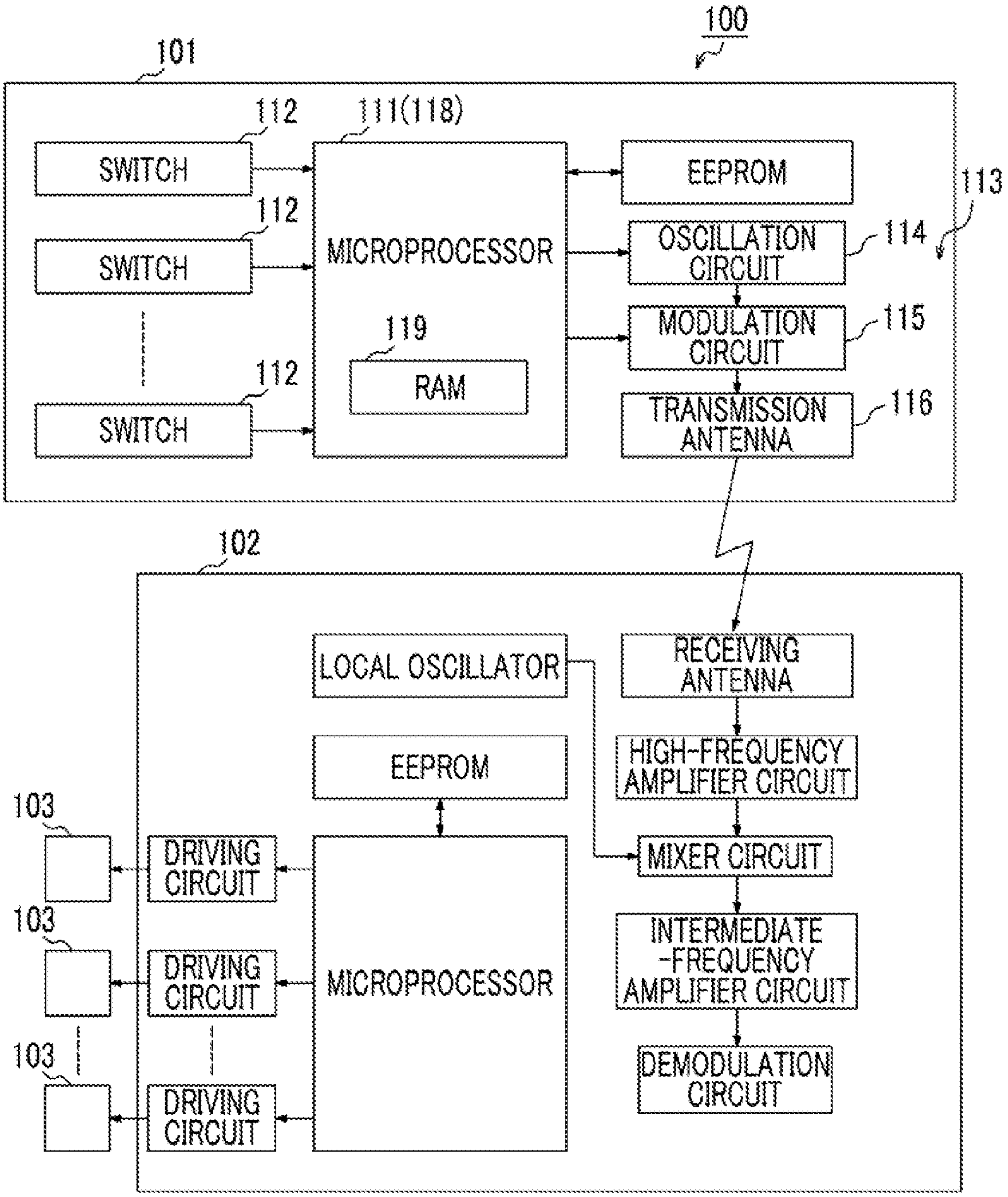
FIG. 6 is an explanatory view showing the configuration of a keyless entry system disclosed in Japanese Unexamined Patent Application Publication No. 11-081764.
Figure 7:
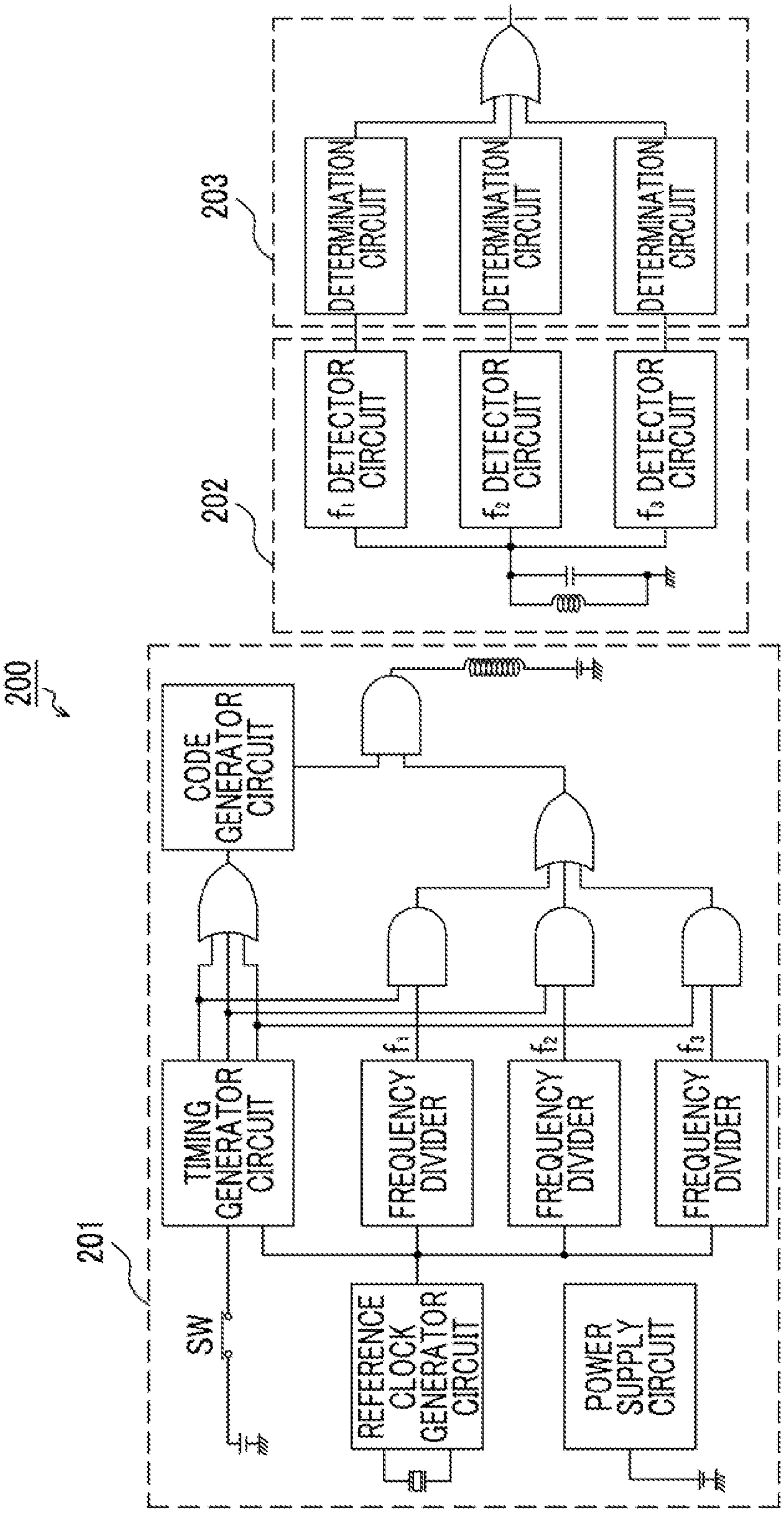
FIG. 7 is an explanatory view showing the configuration of a locking and unlocking device disclosed in Japanese Unexamined Utility Model Registration Application Publication No. 2-91864.

Next, the procedure of the vehicle operation in the present embodiment will be described with reference to FIG. 5. FIG. 5 is a flowchart showing the procedure of the vehicle operation according to the embodiment of the present invention.

As shown in FIG. 5, first, in the transmitter 10, the transmission control means 13 resets a timer function (step S1). In addition, the number of operations of the operation switch 11 is also reset according to the resetting of the timer function.

Then, the transmission control means 13 monitors the operation switch 11, and performs determination based on the presence or absence of the pressing operation on the operation switch 11 (step S2). When there is no pressing operation on the operation switch 11 in step S2, the process returns to step S2 and the transmission control means 13 continues monitoring the operation switch 11. When there is a pressing operation on the operation switch 11 in step S2, the process proceeds to step S3.

Then, in step S3, the transmission control means 13 checks which operation switch 11 of the first and second operation switches 11*a* and 11*b* has been operated. Then, the transmission control means 13 checks the number of operations of the operation switch 11 (step S4). Then, the transmission control means 13 performs determination based on the number of operations of the operation switch 11 (step S5). When the pressing operation on the operation switch 11 is a first pressing operation in step S5, the timer function is operated (step S6). Then, the process proceeds to step S7. When the pressing operation on the operation switch 11 is not a first pressing operation (when the pressing operation on the operation switch 11 is a second or subsequent pressing operation) in step S5, the process proceeds to step S7.

Then, in step S7, the transmission control means 13 generates operation information based on the content of the pressing operation on the operation switch 11. The content of the pressing operation on the operation switch 11 includes a function code corresponding to the pressed operation switch 11 and a count value corresponding to the number of operations of the operation switch 11, and the operation information is information including the function code and the count value. Then, the transmission means 12 transmits the generated operation information to the receiver 20 using the first and second radio signals (step S8).

Then, in the receiver 20, the receiving means 21 receives the first and second radio signals from the transmitter 10, and detects the operation information from the received first and second radio signals (step S9). As a result, the operation information including the function code and the count value is transmitted from the transmitter 10 to the receiver 20.

Then, the determination means 22 checks the loss of information for the transmitted operation information, and performs determination based on the checking result (step S10). When there is no loss of information in step S10, the process proceeds to step S12. When there is a loss of information in one of the operation information transmitted using the first radio signal and the operation information transmitted using the second radio signal in step S10, the determination means 22 recovers the missing information using the other operation information (step S11). After the missing information is recovered, the process proceeds to step S12.

Then, in the transmitter 10, the transmission control means 13 checks whether or not a predetermined amount of time has passed from the first pressing operation on the operation switch 11, and performs determination based on the checking result (step S12). When the predetermined amount of time has not passed in step S12, the process returns to step S2 and the transmission control means 13 in the transmitter 10 repeats monitoring of the operation switch 11. In the receiver 20, the receiving control means 23 waits without transmitting an instruction of the vehicle operation even if the operation information is transmitted. When the predetermined amount of time has passed in step S12, the process proceeds to step S13.

Then, in the receiver 20, the determination means 22 specifies the instruction content of the vehicle operation based on the function code and the count value included in the operation information (step S13). In step S13, when a plurality of pieces of operation information are transmitted until the predetermined amount of time passes from the first pressing operation on the operation switch 11, the determination means 22 specifies the instruction content of the vehicle operation based on the function code and the count value included in the most recent operation information. Then, the receiving control means 23 transmits an instruction corresponding to the specified vehicle operation to the in-vehicle device, such as the door locking device 32, and the vehicle operation, such as the locking and unlocking of the door 31, is performed in response to the issued instruction (step S14). Then, the process returns to step S1, and the procedure from step S1 to step S14 is repeated.

In the keyless entry system 1, a vehicle operation corresponding to multiple operations on the operation switch 11 is performed according to such a procedure. In the present embodiment, when the first operation switch 11*a* is pressed once within the predetermined amount of time, all doors 31 of the vehicle 30 are locked. Also when the first operation switch 11*a* is pressed twice within the predetermined amount of time, all doors 31 of the vehicle 30 are locked. In addition, when the second operation switch 11*b* is pressed once within the predetermined amount of time, only the door 31 of the driver's seat of the vehicle 30 is unlocked. In addition, when the second operation switch 11*b* is pressed twice within the predetermined amount of time, all doors 31 of the vehicle 30 are unlocked. Thus, in the present embodiment, the door 31 to be unlocked can be selected according to the number of operations of the second operation switch 11*b*.

Next, the effects of the present embodiment will be described. The keyless entry system 1 of the present embodiment includes the transmitter 10 and the receiver 20. The transmitter 10 includes the transmission means 12 for transmitting the operation information corresponding to the pressing operation on the operation switch 11 using a radio signal, and the receiver 20 includes the receiving means 21 for receiving the radio signal from the transmitter 10 and detecting the operation information from the received radio signal. The operation information includes a function code corresponding to the operation switch 11 and a count value corresponding to the number of operations of the operation switch 11. Therefore, in the keyless entry system 1, the operation information corresponding to multiple operations on the operation switch 11 can be transmitted from the transmitter 10 to the receiver 20.

In addition, since the transmitter 10 can transmit information regarding the number of operations of the operation switch 11 collectively as a count value, it is possible to easily prevent transmission leakage. That is, it is possible to easily prevent a situation where information corresponding to some of the multiple operations is not transmitted despite having performed the operation on the operation switch 11 multiple times, and accordingly, a vehicle operation that is different from the intention of the user 40 is performed.

In addition, the transmitter 10 transmits operation information using two radio signals in different frequency bands called the first and second radio signals, and the receiver 20 receives the two radio signals and detects the operation information from the two received radio signals. Therefore, even if noise of the same frequency as one of the two radio signals is generated, it is possible to transmit the operation information using the other radio signal. As a result, in the keyless entry system 1, it is possible to transmit the operation information more reliably.

In the keyless entry system 1 of the present embodiment, the transmitter 10 transmits the operation information of the same content simultaneously using two radio signals in different frequency bands called the first and second radio signals, and the receiver 20 receives the two radio signals simultaneously. Therefore, even if noise of the same frequency as one of the two radio signals is generated and the loss of information occurs in the operation information transmitted using the radio signal, the missing information can be recovered using the operation information transmitted using the other radio signal. As a result, it is possible to transmit the operation information more reliably.

Also by transmitting the operation information of the same content multiple times at predetermined intervals, it is possible to increase the reliability of transmission of operation information. In such a method, however, it takes time to transmit the operation information. On the other hand, in the keyless entry system 1 of the present embodiment, the transmitter 10 transmits the operation information of the same content simultaneously using two radio signals. Therefore, it is possible to reduce the time taken to transmit the operation information, compared with the case where the operation information of the same content is transmitted multiple times at predetermined intervals.

In such a system of the present embodiment, when an attempt to reduce the size of the transmitter 10 is made, the configuration of the transmitter 10 becomes complicated if the number of radio signals is large. This becomes an obstacle to miniaturization. In the keyless entry system 1 of the present embodiment, however, the operation information is transmitted and received using two radio signals called the first and second radio signals. Therefore, it is possible to simplify the configuration of the transmitter 10 while maintaining the reliability of transmission of operation information. Such a keyless entry system 1 is suitable when using the transmitter 10 as a portable device carried by the user 40.

In such a system of the present embodiment, when the first and second radio signals are radio signals having frequencies close to each other, interference easily occurs between the first and second radio signals. This may interrupt the transmission of operation information. In the keyless entry system 1 of the present embodiment, however, the first radio signal is a radio signal having a frequency in the 900 MHz band, and the second radio signal is a radio signal having a frequency in the 2.4 GHz band. Thus, since the first and second radio signals are radio signals having frequencies separated from each other, it is possible to suppress the interference between the first and second radio signals. As a result, it is possible to transmit the operation information more reliably.

In addition, the larger the difference between the frequency of the first radio signal and the frequency of the second radio signal, the better. However, when the first and second radio signals are radio signals having frequencies in the UHF band as in the present embodiment, interference between the first and second radio signals can be suppressed to a negligible level if the frequency of the first radio signal and the frequency of the second radio signal are separated from each other by 300 MHz or more. Therefore, it is preferable that the first and second radio signals be radio signals having frequencies separated from each other by 300 MHz or more.

In addition, by applying the keyless entry system 1 of the present embodiment to the vehicle 30, it is possible to perform a vehicle operation corresponding to multiple operations on the operation switch 11 and to transmit an instruction regarding the vehicle operation to the vehicle 30 side more reliably. For example, assuming that the door locking device 32 is an in-vehicle device that is a target of the keyless entry system 1, it is possible to select the door 31 to be unlocked according to the number of operations on the operation switch 11.

While the embodiment of the present invention has been described, the present invention is not limited to the above-described embodiment, and can be appropriately changed without departing from the spirit and scope of the present invention.

For example, in the embodiment of the present invention, the frequency of the first radio signal and the frequency of the second radio signal may be appropriately changed according to the specifications of the system. For example, the frequency of the first radio signal may be set as a frequency in the 400 MHz band, and the frequency of the second radio signal may be set as a frequency in the 800 MHz band.

In the embodiment of the present invention, operation information does not necessarily need to be transmitted using the first and second radio signals. For example, operation information may be transmitted using only the first radio signal normally, and the operation information may be transmitted using the first and second radio signals when the communication state between the transmitter 10 and the receiver 20 becomes worse.

In addition, in the embodiment of the present invention, the number of operation switches 11 may be appropriately changed according to the specifications of the system. For example, when the door 31 to be locked and unlocked is not selected, only one operation switch 11 may be used, and whether the door 31 is to be locked or unlocked may be selected according to the number of operations of the operation switch 11. When a vehicle operation other than the locking and unlocking of the door 31 is also performed using the keyless entry system 1, three or more operation switches 11 may be used.

In addition, in the embodiment of the present invention, the number of operations of the operation switch 11 may be appropriately changed according to the specifications of the system. For example, when three vehicle operations are selectively used using the keyless entry system 1, the number of operations of the operation switch 11 may be set to 1 to 3, and three vehicle operations may be selectively performed corresponding to the number of operations.

In the embodiment of the present invention, when a match with the instruction content of the vehicle operation corresponding to the number of operations of the operation switch 11 is applied, the receiving control means 23 may transmit an instruction of vehicle operation whenever operation information is transmitted, instead of waiting until a predetermined amount of time passes from the first pressing operation on the operation switch 11 even if the operation information is transmitted. For example, in the present embodiment, a vehicle operation corresponding to the first pressing operation on the second operation switch 11*b* is "unlocking of the door of the driver's seat", and the vehicle operation corresponding to the second pressing operation is "unlocking of all doors". In such a case, even if a vehicle operation is performed whenever operation information is transmitted in response to the pressing operation on the second operation switch 11*b*, the number of doors 31 that are sequentially unlocked whenever the operation information is transmitted is increased. Therefore, the user 40 does not feel inconvenienced.

In the embodiment of the present invention, the number of operations of the operation switch 11 may be the total number of operations from the first pressing operation on the operation switch 11 instead of the number of times by which the operation switch 11 is pressed within the predetermined amount of time. The receiving control means 23 may sequentially transmit an instruction of the vehicle operation corresponding to the total number of operations of the operation switch 11. In this case, the transmission control means 13 may not have a timer function. In addition, the transmitter 10 may further include an operation switch for resetting the total number of operations. In addition, it is also possible to set an upper limit of the total number of operations of the operation switch 11 and to reset the total number of operations when pressing operations exceeding the upper limit are performed.

In the embodiment of the present invention, the keyless entry system 1 may be used in a conveyance, such as a ship, in addition to the vehicle. In addition, the keyless entry system 1 may be used for the door of a house.

It should be understood by those skilled in the art that various modifications, combinations, sub-combinations and alterations may occur depending on design requirements and other factors insofar as they are within the scope of the appended claims of the equivalents thereof.

What is claimed is:

1. A keyless entry system comprising a transmitter and a receiver, for operating equipment as a keyless entry target using radio communication between the transmitter and the receiver, wherein the transmitter includes:

a control switch configured to specify an operation of the equipment;

a transmission controller configured to generate operation information corresponding to the operation specified by the control switch, the operation information including a function code corresponding the control switch and a count value indicating a number of switching operations of the control switch; and a transmission section configured to transmit the operation information using a plurality of radio signals in different frequency bands, the transmission section being controlled by the transmission controller;

and wherein the receiver includes:

a receiving section configured to receive the plurality of radio signals and detect the operation information from the plurality of received radio signals; and a determination section configured to determine the specified operation of the equipment based on the function code and the count value included in the detected operation information.

2. The keyless entry system according to claim 1, wherein the transmission section simultaneously transmits the plurality of radio signals each containing the same operation information, and the receiving section receives the plurality of radio signals simultaneously.

3. The keyless entry system according to claim 1, wherein the plurality of radio signals includes a first radio signal in a first frequency band and a second radio signal in a second frequency band substantially different from the first frequency band, the transmitter includes a first transmission section for the first frequency band and a second transmission section for the second frequency band, and the receiver includes a first receiving section for the first frequency band and a second receiving section for the second frequency band.

4. The keyless entry system according to claim 1, wherein the plurality of radio signals have frequencies in a UHF band, the frequencies being separated from each other by 300 MHz or more.

5. The keyless entry system according to claim 1, wherein the transmitter is a portable device carried by a user, the receiver is an in-vehicle receiver mounted in a vehicle, and the equipment is an in-vehicle equipment mounted in the vehicle.

6. The keyless entry system according to claim 1, wherein the determination section further determines if at least part of the operation information is missing from one of the plurality of received radio signals, and determines the specified operation of the equipment by recovering the missing operation information from the operation information detected in another of the plurality of received signals.

7. The keyless entry system according to claim 1, wherein the control switch includes:

a first switch corresponding to a first function; and a second switch corresponding to a second function.

* * * * *